(12) United States Patent
Strepparola et al.

(10) Patent No.: US 6,448,319 B1
(45) Date of Patent: Sep. 10, 2002

(54) CURABLE FLUOROELASTOMER COMPOSITIONS

(75) Inventors: Ezio Strepparola, Treviglio; Franco Barbieri, Tortona, both of (IT)

(73) Assignee: Ausimont S.p.A., Milan (IT)

( * ) Notice: Subject to any disclaimer, the term of this patent is extended or adjusted under 35 U.S.C. 154(b) by 0 days.

(21) Appl. No.: 09/481,698

(22) Filed: Jan. 12, 2000

(30) Foreign Application Priority Data

Jan. 14, 1999 (IT) .......................................... MI99A0049

(51) Int. Cl.⁷ ................................................. C08K 5/06
(52) U.S. Cl. ...................................................... 524/377
(58) Field of Search .......................................... 524/377

(56) References Cited

U.S. PATENT DOCUMENTS

| | | | |
|---|---|---|---|
| 3,544,537 A | 12/1970 | Brace | 260/89.5 |
| 3,766,251 A | 10/1973 | Caporiccio et al. | 260/486 |
| 3,810,874 A | 5/1974 | Mitsch et al. | 260/75 |
| 3,847,978 A | 11/1974 | Sianesi et al. | 260/535 |
| 3,876,654 A | 4/1975 | Pattison | 260/30.4 |
| 4,000,356 A | 12/1976 | Weisgerber et al. | 526/206 |
| 4,085,137 A | 4/1978 | Mitsch et al. | 260/561 |
| 4,259,463 A | 3/1981 | Moggi et al. | 525/331 |
| 4,647,413 A | 3/1987 | Savu | 260/544 |
| 4,814,372 A | 3/1989 | Caporiccio et al. | 528/485 |
| 5,382,614 A * | 1/1995 | Scarati et al. | 524/108 |
| 5,681,881 A * | 10/1997 | Jing et al. | 524/368 |
| 6,005,054 A * | 12/1999 | Barieri et al. | 525/326.3 |

FOREIGN PATENT DOCUMENTS

| | | |
|---|---|---|
| EP | 0 148 482 | 7/1985 |
| EP | 0 151 877 | 8/1985 |
| EP | 0 805 180 | 11/1997 |
| EP | 0 805 180 A1 | 11/1997 |
| GB | 1 356 344 | 6/1974 |
| WO | WO 92/12199 | 7/1992 |

* cited by examiner

*Primary Examiner*—Peter D. Mulcahy
(74) *Attorney, Agent, or Firm*—Arent, Fox, Kintner, Plotkin & Kahn

(57) ABSTRACT

Use in curable fluoroelastomer compositions of additives having polyacetal structure of general formula:

$$HOCH_2\text{—}[R_f\text{—}CH_2O(CH_2O)_cCH_2]_t\text{—}R_f\text{—}CH_2OH \qquad (I)$$

wherein:

$c = 1\text{–}10$, preferably $1\text{–}3$; $t = 0.5\text{–}20$.

$R_f$ = poly-fluorooxyalkylenic chain, having number average molecular weight ($\bar{M}_n$) in the range 500–2,500, preferably 1,000–2,000;

the number average molecular weight of the formula (I) additive is in the range 3,000–15,000, preferably 3,000–10,000.

13 Claims, No Drawings

CURABLE FLUOROELASTOMER COMPOSITIONS

The present invention relates to additives to improve the friction coefficient of curable fluoroelastomer compositions without lowering the adhesion with bonding agents to metal supports and having a very good resistance to the curing alkaline medium.

Specifically it relates to fluoroelastomers able to give unsaturations, i.e. subject to nucleophilic attack. Preferably the fluoroelastomers are vinylidenfluoride-based curable compositions.

Cured elastomers based on vinylidenfluoride copolymers, wherein the vinylidenfluoride is copolymerized with one or more monomers containing an ethylene unsaturation and at least one fluorine atom, are well known and are widely used in a variety of applications fields wherein an exceptional chemical resistance to solvents, lubricants, fuels, acids and similar products, is required.

The cured articles obtained by these elastomer products find the most suitable use as sealing gaskets in general, both in static and dynamic conditions, in the motor, aeronautic, missile, naval, mechanical, chemical field, in protective impermeabilizations of various supports, as protective clothes for the contact with aggressive chemical agents.

The fluoroelastomer curable compositions based on vinylidenfluoride can be cured by ionic and/or by radical way. Generally in both kinds of curing working coadjuvants are used to improve the product processability.

The use of curing coadjuvants to improve the blend extrudibility characteristics and to lower the adhesion phenomena to molds and/or the dirting of the same, is well known in the prior art. Vegetable waxes, polyurethanes having low molecular weight, stearates, polyesters, fluorosilicone oils, etc., can for example be mentioned.

The technical problem that the present invention intends to solve is that to have available cured fluoroelastomer compositions combining to the Theological, processability, chemical and thermal resistance characteristics of the known fluoroelastomers, also a lower dynamic friction coefficient, while preserving the capability to adhere to metal surfaces pretreated with bonding agents.

An improved friction coefficient is particularly desired by users, since it leads for example to a longer duration of the manufactured article and the application of smaller forces during the running stage.

In patent application EP 805,180 in the name of the Applicant, the use as additives of monofunctional and bifunctional perfluoropolyethers having end groups —C(X)FCH$_2$OH wherein X=F, CF$_3$ able to give cured fluoroelastomer compositions endowed by a lower friction coefficient, is described.

Tests carried out by the Applicant (see the comparative Examples) have shown that when said perfluoropolyether additives have number average molecular weight lower than 2,500, for example equal to 2,000, there is a reduction of the friction coefficient which is lower to the case wherein the same perfluoropolyethers having a high molecular weight, for example higher than 4,000, are used. This behaviour is difficult to explain from a theoretic point of view. A non binding hypothesis could be that in the case of low molecular weights, the excessive presence of hydroxyl groups in the curing mass would hinder the additive surface action.

The fact that the additives having a low molecular weight are not equally effective in improving the friction coefficient, is a big limitation from the commercial point of view to the diffusion of the additives of the above mentioned patent. Indeed from the industrial point of view fractions having a molecular weight 1,000–2,000, are more available, while fractions having a higher molecular weight, for example 4,000, are available in a limited amount. In order to obtain high molecular weight fractions, expensive enriching processes are required.

The need was felt to have available additives for cured fluoroelastomer compositions able to give a still improved friction coefficient to obtain end manufactured articles with an higher use time and to further minimize in the running phase the wear-out due to the forces of the mechanical parts in relative motion, said additives being obtainable without further enriching processes.

The Applicant has unexpectedly and surprisingly found new additives formed by polyfluorooxyalkylene units sequences bound each other with hydrogenated acetal bridges, stable at the curing alkaline ambient. Such additives are industrially available with the desired molecular weights and allow to obtain cured fluoroelastomer compositions charaterized by a further decrease of the friction coefficient in comparison with the known additives, without lowering the adhesion with bonding agents to metal supports.

An object of the present invention are therefore additives for fluoroelastomer curable compositions having polyacetal structure of general formula:

$$HOCH_2-[R_f-CH_2O(CH_2O)_cCH_2]_t-R_f-CH_2OH \quad (I)$$

wherein:

c=1–10, preferably 1–3; t=0.5–20.

R$_f$=poly-fluorooxyalkylene in, having number average molecualr weight ($\overline{M}_n$) in the range 500–2,500, preferably 1,000–2,000.

The number average molecular weight of the formula (I) additive is in the range 3,000–15,000, preferably 3,000–10,000.

The poly-fluorooxyalkylene chain R$_f$ preferably comprises monomeric units having at least one of the following structures, statistically distributed along the chain:

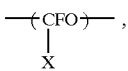

$(-CF_2CF_2O-)$,  $(-CF_2CF_2CF_2O-)$,
$(-CH_2CF_2CF_2O-)$,

wherein X=F, CF$_3$

Specifically, in such formula (I) the R$_f$ chain can preferably have one of the following structures:
1) —CF$_2$O—(CF$_2$O)$_a$—(CF$_2$CF$_2$O)$_b$—CF$_2$—
   with b/a in the range 0.5–2, including the extremes;
2) —CF$_2$O—(CF$_2$—CF$_2$O)$_b$—CF$_2$—
3) —CF$_2$O—(C$_3$F$_6$O)$_r$—(C$_2$F$_4$O)$_b$—(CFXO)$_t$—CF$_2$—,
   with r/b=0.5–2.0 (r+b)/t=10–30
4) —CFX—(OC$_3$F$_6$)$_z$—OCF$_2$(R'f)$_y$—CF$_2$O—(C$_3$F$_6$O)$_z$—CFX—
5) —CF$_2$CH$_2$(OCF$_2$CF$_2$CH$_2$)$_q$—OCF$_2$(R'f)$_y$—O—(CH$_2$CF$_2$CF$_2$O)$_s$CH$_2$CF$_2$— wherein:
X=F, —CF$_3$;
—(C$_3$F$_6$O)— can represent units of formula:

—(CF(CF3)CF$_2$O)— and/or

—(CF$_2$—CF(CF3)O)— a, b, g, r, s, t, z are positive numbers in the range 0–25, the sum of which is such that R$_f$ shows $\overline{M}_n$ values in the range 500–2,500 about, and preferably 1,000–2,000.

R'f=perfluoroalkylene group containing from 1 to 4 carbon atoms;

y=0 or 1.

The preparation of the additives of formula (I) is carried out by reacting, at temperature in the range 0–100° C. and in the presence of an acid medium, oligomers or polymers of the formaldehyde with a diol having a polyfluorooxyalkylene chain of general formula:

HOCH$_2$R$_f$CH$_2$OH (II)

wherein R$_f$ has the above mentioned meaning and has preferably the structure:

1) —CF$_2$O—(CF$_2$O)$_a$—(CF$_2$CF$_2$O)$_b$—CF$_2$— with b/a in the range 0.5–2, including the extremes.

As formaldeyde derivatives used in said process, paraformaldehyde and trioxymethylene can be used.

Even though the sulphuric acid is preferred as reaction acid medium, for its double function as decomposition agent of the formaldehyde oligomers or polymers and dehydration agent in the polycondensation reaction, it is understood that other organic and/or inorganic acids, or mixtures thereof, having the same functions, can be used in the present preparation in substitution of, or together with, the sulphuric acid. For example, trifluoroacetic, p-toluensuphonic, canphosulphonic, methansulphonic acids can be used.

The polycondensation reaction is carried out under stirring, to have a good reactant dispersion, and can be stopped by neutralization of the remaining acid with a base, for example ammonia.

By suitable stoichiometric ratios among formaldehyde, fluorinated diol and acid it is possible to control the molecular weight of the polycondensation product. For example, by operating with sulphuric acid and formaldehyde, molar ratios diol/formaldehyde in the range 0.25–4 and formaldehyde/sulphuric acid in the range 0.1–4 allow to obtain the invention additives having the desired number average molecular weight, preferably in the range 3,000–10,000.

The fluorinated diols of formula (II) are known products. The fluorinated diols having R of structure 1), 2), can be prepared, for example, according to U.S. Pat. Nos. 3,766,251, 3,810,874, 4,085,137 and the European patent application 148,482.

The fluorinated diols having R$_f$ of structure from 3) to 5) can be prepared according to methods described in U.S. Pat. Nos. 3,544,537, 3,766,251, 4,647,413, 4,647,413, 3,847,978, 3,810,874, 4,814,372, and in the European patent application 151,877.

The polycondensation reaction of the fluorinated diols with the formaldehyde derivatives can be carried out in bulk or in the presence of solvents. As solvents or diluents (hydro)(chloro)fluorocarbons, perfluoropolyethers with unreactive end groups as perfluoroalkyls from 1 to 3 carbon atoms, optionally one or both the end groups can contain an hydrogen atom, can be used. For example Galden®, H-Galden®, 1,1,2-trichloro-1,2,2-trifluoroethane,1,2-difluorotetrachloroethane, and haloalkanes in general can be mentioned.

The fluoroelastomers usable according to the present invention, as said, are vinylidenfluoride copolymers with at least another totally or partially fluorinated monomer containing an ethylene unsaturation.

As comonomers hexafluoropropene, tetrafluoroethylene, chlorotrifluoroethylene, 1-hydropentafluoropropene, 2-hydropentafluoropropene, perfluoroalkylvinylethers wherein alkyl has from 1 to 3 carbon atoms, can be mentioned.

Specifically vinylidenfluoride copolymers with hexafluoropropene, optionally tetrafluoroethylene, can be mentioned.

The amount of perfluoroalkylvinylether and/or hexafluoropropene is generally in the range 0.5–30% by moles on the total copolymer; tetrafluoroethylene ranges from 0 to 60% by moles, the vinyliden fluoride generally ranges from 10 to 85% by moles.

Also other fluorinated or non fluorinated monomers can be used as comonomers provided that they contain a double bond of ethylene type, for example ethylene or alpha-olefins from 1 to 4 carbon atoms.

Said fluoroelastomers can be prepared as described in the literature (Kirk-Othmer, Encyclopaedia of Chem. Technology vol. 8, pag. 500 and seq., 1979) preferably operating in aqueous emulsion and optionally in the presence of chain transfer agents such as those described in U.S. Pat. No. 4,000,356.

In particular copolymers wherein the vinylidenfluoride is in the range 40%–85% by moles, the hexafluoropropene in the range 15%–30% by moles, and tetrafluoroethylene in the range 0–30% by moles, are preferred.

As said, the fluoroelastomer curable compositions based on vinylidenfluoride can be cured by ionic and/or by radical way.

In ionic curing the essential components are the following:

(A) a fluoroelastomer copolymer, preferably vinylidenfluoride with at least another fluorinated monomer containing an ethylene unsaturation;

(B) a curing accelerant selected in particular from the following ones: quaternary ammonium salt, quaternary phosphonium salt, phosphoranaminic derivative;

(C) one or more basic acceptors, such as for example MgO and Ca(OH)$_2$;

(D) a polyhydroxylated crosslinking agent.

Examples of these compositions are described in GB 1,356,344, U.S. Pat. Nos. 3,876,654, 4,259,463.

Other usable fluoroelastomers are those which are crosslinked by radical curing. In this case the fluoroelastomer must contain radical curing sites deriving from the introduction in the chain of monomers capable of radical attack, for example brominated compounds such as bromoperfluoroolefins, for example bromotrifluoroethylene, or bromoperfluoroalkylvinylethers, for example bromoperfluoroethylvinylether. Preferably the fluoroelastomer end groups contain iodine atoms deriving from saturated organic compounds such as for example R$_f$'I or R$_f$'I$_2$ wherein R$_f$' is an hydrofluorocarbon, chlorofluorocarbon or hydrocarbon radical having from 1 to 12 carbon atoms, preferably from 4 to 6 carbon atoms. The compounds are crosslinked by the addition of radical initiators, generally of peroxidic type, such as alkylperoxides and the addition of bridging agents, such as for example triallylisocyanurate (TAIC), triallylcyanurate (TAC), triallylphosphate. Acid acceptors such as for example zinc or lead oxide are also added.

In the case of ionic curing the preferred accelerants, of the previously mentioned classes, are the following:

among the ammonium quaternary salts: methyltrioctylammonium chloride, laurylpyridinium bromide, benzyltrioctylammonium chloride;

among the phosphonium quaternary salts: benzyltriphenylphosphonium chloride, benzyltriphenylphosphonium tetrafluoroborate, methyltrioctylphosphonium acetate, carbethoxymethyl-triphenylphosphonium bromide;

among the phosphoraminic derivatives or amino phosphonium compounds: 1 chloro, 1 benzyl, 1 diphenyl N(diethyl)phosphoranamine and tetrafluoroborate, 1 benzyl, N,N',N''(hexamethyl)phosphorantriamine, 1 bromo, 1 benzyl, 1 phenyl N,N'(tetraethyl)phosphorandiamine.

Also adducts between accelerating and curing agents can be used in amounts in the range 1–5 phr, preferably 2–4.5 phr, in a molar ratio between accelerating agent and curing agent from 1:2 to 1:5 for fluoroelastomers wherein the fluorine content is higher than or equal to 67% by weight (see U.S. Pat. No. 5,830,381); in a molar ratio between the accelerating agent and the curing agent from 1:3 to 1:5 for fluoroelastomers wherein the fluorine content is lower than 67% by weight (see U.S. Pat. No. 5,648,429). The preparation of said adducts is reported in detail in the mentioned patents.

The basic reactants necessary to cure are inorganic compounds such as for example ZnO, MgO, PbO, CaO or an oxide and hydroxide mixture of these same metals or weak acid salts as described in U.S. Pat. No. 3,876,654.

In the radical curing, as curing agents bridge agents can be used, such as for example triallylcyanurate (TAC) and triallylisocyanurate (TAIC). Small amounts of the accelerating agents and of the basic reactants above mentioned for the ionic curing can also be used.

The curing agent in ionic curing is a polyhydroxylated compound well known in the fluoroelastomer curing. It can be mentioned: hydroquinone, bisphenol AF, resorcin, 2,2'-bis(p.hydroxyphenyl)-hexafluoropropane or bisphenol AF, 2,2'-bis(p.hydroxyphenyl)-propane, bifunctional (per)fluoropolyethers having hydroxyl termination; bisphenol AF is preferably used.

Examples of these compounds are reported in U.S. Pat. No. 3,876,654.

In general for 100 parts by weight of an elastomer copolymer of the vinylidenfluoride with one or more fluorinated monomers as above mentioned, are used:

from 1 to 40 phr (part for hundred part of rubber) of the inorganic acid acceptor, constituted by one or more basic oxides of bivalent metals, as above mentioned, optionally in the form of cation complexes or chelates, optionally in the presence of 0–10 parts by weight of one or more basic compounds, selected in the group comprising the calcium, strontium and barium hydrates, weak acid metal salts such as carbonates, benzoates and calcium, strontium, barium, sodium and potassium phosphates, optionally in the form of complexes with the usual chelants or cation complexants well known to the skilled in the field;

from 0.5 to 4 parts by weight, preferably from 1 to 2.5, of the invention additives;

from 0.2 to 4 parts of a curing accelerant selected from those of the above described classes;

from 0.3 to 6 parts of curing agent both in ionic and peroxidic curing. Said crosslinking agents are above indicated;

for the curing of radical type from 0.5 to 10 parts of radical initiator.

The curable compositions of the above mentioned type are cured with a process consisting in heating first said compositions under pressure, at temperatures in the range 130° C.–230° C., preferably 160° C.–200° C., for a time from 0.5 to 60 minutes and preferably from 1 to 20 minutes; subsequently the so obtained manufactured articles are post-cured in stove or in oven, at atmospheric pressure, at temperatures in the range 130° C.–315° C., preferably 200° C.–275° C., for a time from 5 to 48 hours, preferably from 10 to 24 hours.

The present invention additives allow to achieve a lowered friction coefficient, which is also combined with the surprising fact that the adhesion to the metal supports treated with bonding agents does not undergo any reduction. This further result is quite surprising since the conventional coadjuvants used to improve the fluoroelastomer processability must be used in very low amounts, generally at most 1 phr, in order to avoid undesired effects on the adhesion.

Furthermore it has been found by the Applicant that the present invention additives allow to achieve a lowered friction coefficient which is maintained during the time.

The curable compositions according to the present invention contain besides the previously indicated substances and the invention additive, inert fillers such as for example carbon black, polytetrafluoroethylene, white and coloured fillers.

The curable composition components according to the present invention are easily incorporable, both separately and premixed, in the vinylidenfluoride elastomer copolymer.

Good curing rates at the usual working temperatures can thus be reached without meeting any premature scorch (precuring) in the preliminary working phases, previous to the real curing operation.

The present invention will be now better illustrated by the following embodiment examples, which have a merely indicative purpose, which is not limitative of the scope of the invention itself.

EXAMPLES

Characterization

On the useful products obtained according to the invention the following determinations have been carried out:

Additive Structure Determination

It has been determined by $^1H$ NMR and $^{13}C$ NMR on a Varian (300 MHz) instrument, which has allowed to establish the ratio among the various methylene groups present in the chain.

Moreover by $^{19}F$ NMR analysis the functionality values and the average number molecular weights have been determined.

Determination of the Dynamic Friction Coefficient of Cured Fluoroelastomers

The adopted procedure is the following:

The rubber sheets after molding and after post curing have been kept hung in a container to avoid any surface contamination.

The sheets have been conditioned at 23° C. and 50% RH (relative humidity) for at least 48 hours.

The sheets have been placed on a horizontal rigid plane of a dynamometer and let adhere by double adhesive tape.

The device containing the two steel spheres having 12.7 mm diameter is put on the test sheet after having carefully cleaned the two spheres with acetone and let them perfectly dry.

The test is carried out at the creeping rate of 100 mm/min by applying on the spheres three different load levels (2.11 N, 4.07 N and 7.01 N) each time considering different zones of the sheet. For each sample two sheets have been examined.

The dynamic friction coefficient (f.c.) is calculated by the equation:

$$f.c. = F/P$$

wherein
F=friction strength
P=weight applied on the spheres.

Additive 1 Preparation

To 10 Kg of a α,ω-dihydroxymethylperfluoropolyoxyalkane of formula:

with m/n=1 and a number average molecular weight 2,000, 150 g of powdered paraformaldehyde are added; after mixture homogeneization 150 g of $H_2SO_4$ at 96% by weight are added so as to achieve a diol/formaldehyde molar ratio equal to 1 and a formaldeyde/$H_2SO_4$ molar ratio equal to 3.3.

After 15 hours of stirring at 50°–60° C., it is cooled at room temperature, a mixture of 170 g of 30% $NH_3$, 500 ml of water and 500 ml of ethyl alcohol is introduced to neutralize and separate the phases; two phases are obtained, the heaviest is dried at 80°–100° C. at a pressure of 20–30 mmHg. The residual product weighs about 10 kg and has average number molecular weight equal to 4200 determined by $^{19}F$ NMR with a ratio $\underline{CF_2}CH_2OCH_2/\underline{CF_2}CH_2OH$ equal to 1.1, so as to give a compound of formula:

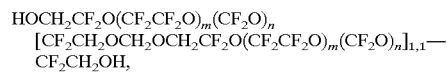

indicated as additive 1 of the invention.

Additive 2 Preparation

To 500 g of a α,ω-dihydroxymethylperfluoropolyoxyalkane having the formula and the molecular weight as in Example 1, 5 g of powdered paraformaldehyde are added and to the stirred mixture 5 g of $H_2SO_4$ at 96% by weight so as to obtain a diol/formaldehyde molar ratio equal to 1.5 and a formaldeyde/$H_2SO_4$ molar ratio equal to 3.3.

After 15 hours of stirring at 50°–60° C., it is cooled at room temperature, a mixture of 10 g of 30% $NH_3$, 50 ml of water and 50 ml of ethyl alcohol is introduced to neutralize and separate the phases; two phases are obtained, the heaviest one is dried at 80°–100° C. at a pressure of 20–30 mmHg. The residual product weighs about 500 g and by $^{19}F$ NMR shows ratios between the groups $\underline{CF_2}CH_2OCH_2/\underline{CF_2}CH_2OH$ equal to 0.6, so as to give a compound of formula:

HOCH$_2$CF$_2$O(CF$_2$CF$_2$O)$_m$(CF$_2$O)$_n$
[CF$_2$CH$_2$OCH$_2$OCH$_2$CF$_2$O(CF$_2$CF$_2$O)d$_m$(CF$_2$O)$_n$]$_{0.6}$—
CF$_2$CH$_2$OH, with molecular weight 3,200, indicated as additive 2.

Additive 3 Preparation

To 50 g of a α,ω-dihydroxymethylperfluoropolyoxyalkane having the formula:

with m/n=1 and molecular weight 1,000, 2 g of powdered paraformaldehyde are added; after mixture homogeneization 2 g of $H_2SO_4$ at 96% by weight are added so as to obtain a diol/formaldehyde molar ratio equal to 0.75 and a formaldeyde/$H_2SO_4$ molar ratio equal to 3.3.

After 15 hours of stirring at 50°–60° C., it is cooled at room temperature, a mixture of 5 g of 30% $NH_3$, 20 ml of water and 20 ml of ethyl alcohol is introduced to neutralize and separate the phases; two phases are obtained, the heaviest one is dried at 80°–100° C. at a pressure of 20–30 mmHg. The residual product weighs about 50 g and has a molecular weight equal to 3,500 determined by $^{19}F$ NMR with a ratio $\underline{CF_2}CH_2OCH_2/\underline{CF_2}CH_2OH$ equal to 2.5, so as to give a compound of formula:

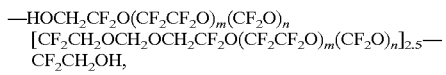

indicated as invention additive 3.

Additive 4 Preparation

To 50 g of a α,ω-dihydroxymethylperfluoropolyoxyalkane having the formula and the molecular weight as in Example 3, 3 g of powdered paraformaldehyde are added and to the obtained stirred mixture 3 g of $H_2SO_4$ at 96% by weight so as to obtain a diol/formaldehyde molar ratio equal to 0.5 and a formaldeyde/$H_2SO_4$ molar ratio equal to 3.3.

After 15 hours of stirring at 50°–60° C., it is cooled at room temperature, a mixture of 5 g of 30% $NH_3$, 20 ml of water and 20 ml of ethyl alcohol is introduced to separate the phases; two phases are obtained, the heaviest one is dried at 80°–100° C. at a pressure of 20–30 mmHg. The residual product weighs about 50 g and by $^{19}F$ NMR shows a ratio between the groups $\underline{CF_2}CH_2OCH_2/\underline{CF_2}CH_2OH$ equal to 0.9, so as to give a compound of formula:

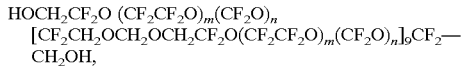

with molecular weight 10,000, indicated as additive 4.

Examples 1–7

In the Examples 1–7 a TECNOFLON® FOR 420 fluoroelastomer is used which is a $CH_2=CF_2/C_3F_6$ copolymer in 4/1 molar ratio having specific weight 1.8 at 25° C., Mooney (1+10) at 121° C. equal to 22 (ASTM D 1646), additivated as follows:

| | |
|---|---|
| Copolymer: | 100 parts |
| Bisphenol AF: | 2.1 phr |
| Accelerant: 1 chloro-1,1 diphenyl-1 benzyl-N,N diethylphosphoranamine | 0.4 phr |

The blend to be cured is so formed:

| | |
|---|---|
| TECNOFLON FOR 420 | 100 parts |
| MgO | 3 phr |
| Ca(OH)$_2$ | 6 phr |
| Black MT | 20 phr |
| additive | 2 phr |

Curing is carried out in press at 170° C. for 10' and by post-treatment in stove at 250° C. for 24 hours.

Examples 1–4 relate to the use of the additives 1–4 of the present invention.

Example 5 (comparative) relates to the test without additive.

Examples 6–7 (comparative) relate to α,ω-dihydroxymethylperfluoropolyoxyalkanes additives described in EP 805,180 having the formula:

$$HOCH_2CF_2O(CF_2CF_2O)_m(CF_2O)_nCF_2CH_2OH$$

with m/n=1 and molecular weight respectively 4,800 and 2,000.

The results, with the change of the used additive, are shown in Table 1, wherein the dynamic friction coefficient is evaluated for 3 different values of the applied load, expressed in Newton.

TABLE 1

|  | Friction coefficient | | |
| --- | --- | --- | --- |
|  | Load 2.11 N | Load 4.07 N | Load 7.01 N |
| EXAMPLE 1 (additive 1) | 0.47 | 0.35 | 0.32 |
| EXAMPLE 2 (additive 2) | 0.52 | 0.4 | 0.35 |
| EXAMPLE 3 (additive 3) | 0.56 | 0.41 | 0.36 |
| EXAMPLE 4 (additive 4) | 0.56 | 0.4 | 0.35 |
| EXAMPLE 5 (comparative) | 1.9 | 1.6 | 1.6 |
| EXAMPLE 6 (comparative) | 0.66 | 0.54 | 0.47 |
| EXAMPLE 7 (comparative) | 1.1 | 0.92 | 0.8 |

What is claimed is:

1. A process for improving the coefficient of friction of curable fluoroelastomers comprising adding thereto additives having polyacetal structure of the formula;

$$HOCH_2-[R_f-CH_2O(CH_2O)_cCH_2]_t-R_f-CH_2OH \quad (I)$$

wherein:
c=1–10, t=0.5–20
$R_f$=poly-fluorooxyalkylene chain, having an average number molecular weight (Mn) in the range 500–2,500; and the
number average molecular weight of the additive of formula (I) is in the range 3,000–15,000.

2. The process according to claim 1, wherein the $R_f$ chain comprises monomeric units having at least one of the following structures, statistically distributed along the chain:

$$-(CFO)-$$
$$\phantom{-(C}X$$

$(-CF_2CF_2O-)$,  $(-CF_2CF_2CF_2O-)$,
$(-CH_2CF_2CF_2O-)$, $-(CFCF_2O)-$, and $-(CF_2CFO)-$,
$\phantom{-(CF}CF_3 \phantom{CF_2O)-aa}CF_3$ wherein X=F, $CF_3$.

3. The process according to claim 2, wherein the $R_f$ chain can have one of the following structures:
1) $-CF_2O-(CF_2O)_a-(CF_2CF_2O)_b-CF_2-$
   with b/a in the range 0.5–2, including the extremes;
2) $-CF_2O-(CF_2-CF_2O)_b-CF_2-$
3) $-CF_2O-(CF_3F_6O)_r-(C_2F_4O)_b-(CFXO)_t-CF_2-$,
   with r/b=0.5–2.0(r+b)/t=10–30;
4) $-CFX-(OC_3F_6)_z-OCF_2(R'f)_y-CF_2O-(C_3F_6O)_z-CFX-$; and
5) $-CF_2CH_2(OCF_2CF_2CH_2)_q-OCF_2(R'f)_y-O-(CH_2CF_2CF_2-O)_sCH_2CF_2-$ wherein:
X=F, $-CF_3$;
$-(C_3F_6O)-$ can represent units of formula:

$$-(CF(CF_3)CF_2O)-$$

and/or $$-(CF_2-CF(CF_3)O)-$$

a, b, q, r, s, t, z are positive numbers in the range 0–25, the sum of which is such that $R_f$ shows $M_n$ values in the range about 500- to about 2,500
R'f=a perfluoroalkylene group containing from 1 to 4 carbon atoms;
and y=0 or 1.

4. The process according to claims 1 wherein the fluoroelastomers are vinylidenfluoride copolymers with at least another totally or partially fluorinated monomer containing an ethylene unsaturation.

5. The process according to claim 4, wherein the vinylidenfluoride comonomers are selected from the group consisting of hexafluoropropene, tetrafluoroethylene, chlorotrifluoroethylene, 1-hydropentafluoropropene, 2-hydropentafluoropropene, and perfluoroalkylvinylethers wherein alkyl has from 1–3 C atoms.

6. The process according to claim 4, wherein the perfluoroalklvinylether and/or hexafluoropropene amount is in the range 0.5–30% by moles based on the total copolymer; tetrafluoroethylene ranges from 0 to 60% by moles, and vinylidenfluoride ranges from 10 to 85% by moles.

7. The process according to claim 6, wherein the viinylidenfluoride is in the range 40%–85% by moles, hexafluoropropene in the range 15%–30% by moles, and tetrafluoroethylene in the range 0–30% by moles.

8. The process according to claim 1, wherein for every 100 parts by weight of a vinlyidenfluoride elastomer copolymer, 0.5 to 4 parts by weight of the additives are added.

9. The process according to claim 8, wherein for every 100 parts by weight of a vinlyidenfluoride elastomer copolymer, from 1 to 2.5 parts by weight of the additives are added.

10. The process according to claim 1, wherein the fluoroelastomer curable compositions are cured by ionic and/or by full radical curing methods.

11. The process according to claim 10, wherein in ionic curing the essential components are:
(A) a vinylidenfluoride copolymer with at least one other fluorinated monomer containing an ethylene unsaturation;
(B) a curing accelerant selected from the group consisting of: quaternary ammonium salt, quaternary phosphonium salt, and phosphoranaminic derivative;
(C) one or more basic acceptors, and
(D) a polyhydroxylated crosslinking agent.

12. The process according to claim 10, wherein adducts between accelerating and curing agents in amounts in the range 1–5 phr, in a molar ratio between accelerating agent and curing agent from 1:2 to 1:5 for fluoroelastomers wherein the fluorine content is greater than or equal to 67% by weight are used; and in a molar ratio between accelerating agent and curing agent from 1:3 to 1:5 for fluoroelastomers wherein the chlorine content is lower than 67% by weight.

13. The process according to claim 10, wherein the curable compositions further comprise inert fillers selected from the group consisting of carbon black, polytetrafluoroethylene, white and colored fillers.

* * * * *